(12) United States Patent
Kegel

(10) Patent No.: US 9,489,173 B2
(45) Date of Patent: Nov. 8, 2016

(54) RESIZABLE AND RELOCATABLE QUEUE

(71) Applicant: Advanced Micro Devices, Inc., Sunnyvale, CA (US)

(72) Inventor: Andrew G. Kegel, Redmond, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 182 days.

(21) Appl. No.: 14/296,373

(22) Filed: Jun. 4, 2014

(65) Prior Publication Data

US 2015/0355883 A1  Dec. 10, 2015

(51) Int. Cl.
*G06F 5/08* (2006.01)
*G06F 5/06* (2006.01)
*G06F 5/10* (2006.01)

(52) U.S. Cl.
CPC .............. *G06F 5/085* (2013.01); *G06F 5/065* (2013.01); *G06F 5/10* (2013.01); *G06F 2205/063* (2013.01); *G06F 2205/064* (2013.01)

(58) Field of Classification Search
None
See application file for complete search history.

(56) References Cited

U.S. PATENT DOCUMENTS

| | | | | |
|---|---|---|---|---|
| 5,873,089 A * | 2/1999 | Regache | .................... | G06F 5/06 |
| 6,112,267 A * | 8/2000 | McCormack | ........... | G06F 5/065 710/52 |
| 6,145,061 A * | 11/2000 | Garcia | ...................... | G06F 5/06 710/54 |
| 7,865,638 B1 * | 1/2011 | Wyatt | ................. | G06F 12/0284 710/52 |
| 2003/0145012 A1 * | 7/2003 | Kurth | ................ | G06F 17/30958 |
| 2003/0188057 A1 * | 10/2003 | Lam | ........................ | H04L 49/90 710/54 |
| 2005/0066082 A1 * | 3/2005 | Forin | ...................... | G06F 5/065 710/52 |
| 2007/0276973 A1 * | 11/2007 | Tan | ........................... | G06F 5/14 710/112 |
| 2008/0148008 A1 * | 6/2008 | Arndt | ...................... | G06F 5/10 711/209 |

\* cited by examiner

*Primary Examiner* — Kaushikkumar Patel

(74) *Attorney, Agent, or Firm* — Park, Vaughan, Fleming & Dowler LLP

(57) ABSTRACT

A computing device with a queue stored in a memory of the computing device is described. The queue may be relocated and/or resized in the memory using a queue address, a queue size, a head pointer, and/or a tail pointer associated with the queue. During operation, a processor, at the request of a software entity, updates one or more values associated with the queue to relocate and/or resize the queue. In response, a write mechanism performs one or more operations to enable the use of the relocated and/or resized queue. In addition, when the queue is relocated, the processor, at the request of the software entity, performs one or more operations to process remaining valid entries in an original location of the queue.

21 Claims, 11 Drawing Sheets

BEFORE RELOCATION:

AFTER RELOCATION:

BEFORE RESIZING WITHOUT RELOCATION:

AFTER RESIZING WITHOUT RELOCATION:

RESIZABLE AND RELOCATABLE QUEUE

BACKGROUND

1. Field

The described embodiments relate to computing devices. More specifically, the described embodiments relate to resizable and relocatable queues in computing devices.

2. Related Art

Many computing devices use queues to hold data to be processed. For example, in some computing devices, a writer (e.g., a functional block such as a processor, an input/output (JO) mechanism, etc.) can write data to a queue, where the data is then held until a reader (e.g., a functional block such as a processor, an JO mechanism, etc.) reads the data from the queue and processes the data. Such computing devices can use the queues to hold various types of data, such as event notifications that are awaiting processing (e.g., error notifications, data available notifications, operating condition warnings, etc.). In these computing devices, data can be held in a queue until a reader is available to read and process the data, which can help to conceal the latency of processing the data from writers in the computing device and avoid some of the need for writers and readers to be synchronized when performing operations.

Depending on factors such as the type of data stored in the queue, the nature of the writers and/or readers, the required speed of writes/reads, queues may be implemented in various ways in computing devices. For example, in some computing devices, dedicated registers, memory circuits, and/or other functional blocks in the computing device are used as queues. As another example, in some computing devices, queues are stored in a main memory of the computing device.

In some computing devices, queues that are stored in a main memory can be resized and/or relocated during the operation of the computing device. For example, a queue may initially be allocated a block of memory corresponding to an initial queue size at an initial location in memory (e.g., a queue with 24 64-byte entries would be allocated 1,536 bytes plus space for metadata for the queue starting from a given address in memory). During operation, e.g., as demand for the queue and/or memory space increases or decreases, the queue may be relocated to a new location in memory, perhaps while also being resized (i.e., made larger or smaller), and/or may be resized in the original location in memory.

In certain cases, although resizing and/or relocating queues might be beneficial, resizing and/or relocating the queues may be impractical due to operating constraints on computing devices. For example, queues may be used to hold data awaiting processing (e.g., event notifications) for "asynchronous" writers such as IO mechanisms, etc. (e.g., disk controllers, IO devices/buses, PCI devices, etc.) that perform writes to the queue any time that an input or output event occurs. In order to relocate and/or resize a queue for asynchronous writers, the writers must be halted (i.e., must be forced to stop writing to the queue) while the queue is relocated and/or resized. However, stopping asynchronous writers may be directly reflected in a reduction in the performance of the system. For example, IO devices may not function as expected, events may not be processed in acceptably short times, etc. This reduction in performance can impair a user's experience while using the computer.

BRIEF DESCRIPTION OF THE FIGURES

Throughout the figures and the description, like reference numerals refer to the same figure elements.

DETAILED DESCRIPTION

Figure 1:
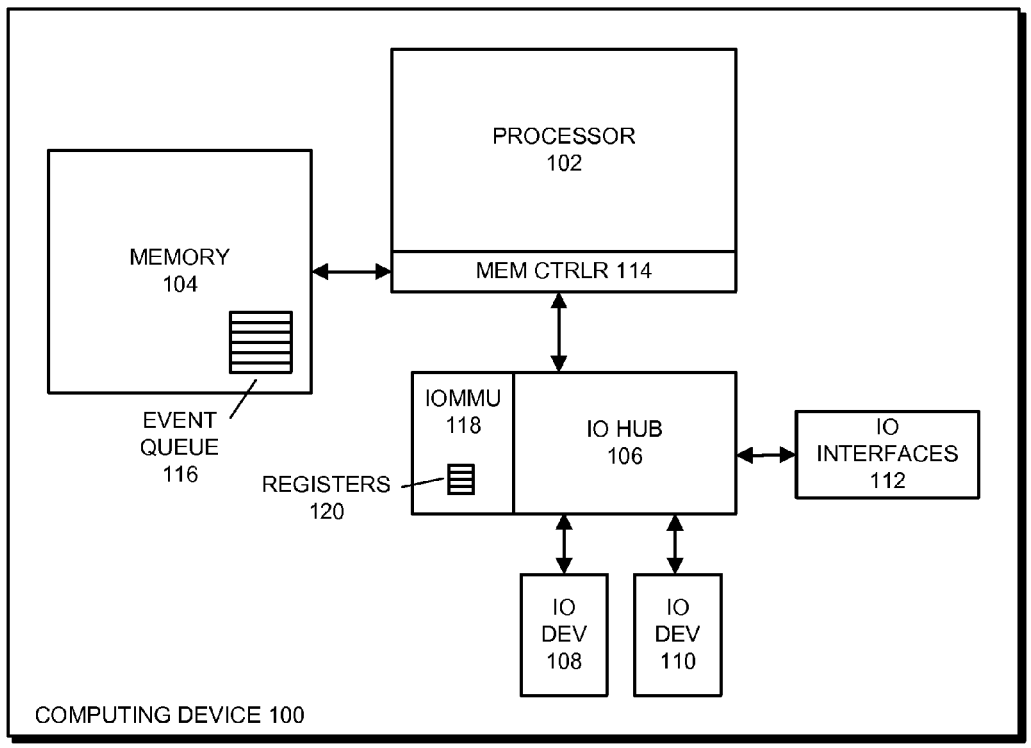
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Overview

The described embodiments use queues stored in a memory in a computing device for performing operations in the computing device. In these embodiments, a writer in the computing device (e.g., a functional block such as an input/output (IO) hub, a processor, etc.) can write data to a queue in the computing device, where the data is then held until a reader in the computing device (e.g., a functional block such as a processor, an event handler, etc.) reads the data from the queue and processes the data. For example, an IO hub may write event notifications (i.e., data) to an event queue, where the event notifications are held until a processor reads the event notifications from the event queue and processes the event notifications. In the described embodiments, the computing device is able to relocate and/or resize queues that are stored in the memory without halting writers to enable the relocation and/or resizing.

In some embodiments, the computing device maintains a set of values associated with each queue that are used by entities in the computing device (e.g., writers, readers, controllers, etc.) for performing operations using the queue (e.g., reads, writes, monitoring, etc.). In some embodiments, these values include a queue size, queue address, head pointer, and tail pointer that are stored in hardware in the computing device (e.g., in dedicated registers in the computing device). The queue size and address include, respectively, a size value that indicates a size of the queue and a value indicating the location of the queue in the memory. The head pointer indicates a "first" valid/active entry in the queue and thus an entry in the queue from where a reader is to read the next data (assuming a first-in-first-out (FIFO) queue). The tail pointer indicates a "last" valid/active entry in the queue and thus indicates an entry in the queue at which a writer is to write new data in the queue. In these embodiments, when a writer writes data to the queue, the writer advances the tail pointer to a next neighboring entry in the queue. In addition, when a reader reads and processes data from the queue, the reader advances the head pointer to a next neighboring entry in the queue.

In some embodiments, a software entity (e.g., an operating system, an application program, a daemon, etc.) executed by a processor in the computing device can relocate the queue by updating the value for the queue address. A write mechanism (e.g., an IO hub, a processor, a controller, etc.) in the computing device monitors for changes to the value in the queue address and, upon detecting the software entity's update of the value in the queue address, sets the value of the head pointer and the tail pointer equal to each other (e.g., to zero, NULL, or another value). In these embodiments, setting the head pointer and the tail pointer equal to one another causes the write mechanism to use the value in the queue address to determine where to write a subsequent value to the queue, thereby starting to write subsequent data to the queue in the updated location. In these embodiments, the operations of updating (by the software entity) and setting (by the write mechanism) are performed atomically with respect to write operations, so a write to the queue does not occur between the updating of the value in the queue address and setting of the head and tail pointers.

In some embodiments, the software entity can also resize a queue by updating the value for the queue size. In these embodiments, the resizing can occur as the queue is relocated (i.e., so that the queue is both relocated and resized) by atomically updating both the value of the queue size and the queue address. In addition, in these embodiments, the queue can be resized "in place" (i.e., without also being relocated) by updating the value for the queue size. When the queue is resized in place, the software entity may set an adjustment flag that prevents the write mechanism from changing of the values of the head pointer and the tail pointer upon detecting the update of the queue size value. In this way, the queue continues to be written to and read from in the original location in memory using the head pointer and tail pointer after being resized in place.

In some embodiments, when the queue is relocated, the software entity can acquire (or retain) pre-relocation values for the queue address and queue size, and can use the acquired values to process any remaining entries that store valid data at the prior location of the queue. In these embodiments, the software entity can determine the prior location of the queue from the acquired queue address and can, until a last entry in the prior location of the queue has been reached (the location of which is determined using the prior queue size), determine if a valid flag is set for each entry. When the valid flag is set, the software entity can read data from the entry and process the data. When the valid flag is not set, the software entity can skip the entry. In these embodiments, when the write mechanism writes data to an entry of the queue, the write mechanism sets the valid flag in the entry, and when the software entity reads and processes data from an entry in the queue, the software entity clears/unsets the valid flag for the entry. In this way, the queue should have valid flags set for each entry that stores data that is to be read and processed. In these embodiments, after the data from each entry in the queue has been read and processed, the memory occupied by the queue can be freed (i.e., returned to a pool of memory available for allocation).

By relocating and/or resizing the queue as described, the described embodiments are able to relocate and/or resize the queue without halting writes to the queue. Avoiding halting writes can avoid delays and, particularly in cases where there are numerous writers and/or asynchronous writers (e.g., for an IO event queue, etc.) can avoid the computing device not functioning as responsively as expected/desired. This enables better use of queues in the computing device while also preserving a user experience for a user of the computer.

Computing Device

FIG. 1 presents a block diagram illustrating a computing device 100 in accordance with some embodiments. As can be seen in FIG. 1, computing device 100 includes processor 102, memory 104, input-output (IO) hub 106, IO devices 108-110, and IO interfaces 112. Processor 102 is a functional block that performs computational operations in computing device 100. Processor 102 includes one or more central processing units (CPUs), graphics processing units (GPUs), embedded processors, application specific integrated circuits (ASICs), and/or other computational mechanisms. As can be seen in FIG. 1, processor 102 includes memory controller 114 ("MEM CTRLR 114"). Memory controller 114 performs operations for handling interactions between processor 102 and memory 104 such as handling reading and writing of data from processor 102 to memory 104, controlling the memory circuits in memory 104, virtual address to physical address translation, etc.

Memory 104 is the "main memory" of computing device 100, and comprises memory circuits such as one or more of DRAM, DDR SDRAM, and/or other types of memory circuits, as well as control circuits for handling accesses of the instructions and data that are stored in the memory circuits. As can be seen in FIG. 1, memory 104 stores event queue 116 (i.e., event queue is stored in a portion of the memory circuits in memory 104). In some embodiments, event queue 116 is used to store/buffer IO event notifications forwarded from IO memory management unit 118 ("IOMMU 118") (and, more generally, IO hub 106) so that the event notifications can be retrieved and processed by processor 102.

IO hub 106 is a functional block that handles interactions between peripheral devices such as IO devices 108-110 and interfaces such as IO interfaces 112 and processor 102 and memory 104. For example, IO hub 106 may receive communications (inputs, events, data, etc.) from peripheral devices and forward the communications to processor 102 and/or memory 104. As another example, IO hub IO may receive communications (commands, outputs, events, data, etc.) from processor 102 and/or memory 104 and forward the communication to corresponding peripheral devices. Note that IO devices 108-110 include peripheral devices such as one or more of disk drives, bus-connected devices (e.g., PCIe connected devices), extension cards (video cards, sound cards, etc.), mice/keyboards, microphones, etc., and IO interfaces 112 include interfaces such as a low pin count (LPC) interface, a peripheral component interface (PCI) interface, a serial ATA (SATA) interface, etc. to which peripheral devices may be connected.

As can be seen in FIG. 1, IO hub 106 includes IOMMU 118, which performs operations such as address translation for memory accesses for peripheral devices, memory access protection for accesses in memory 104 from peripheral devices, peripheral event and interrupt handling, etc. IOMMU 118 includes a set of registers 120 that store values associated with event queue 116. Generally, the values in the registers 120 are used by IOMMU 118 and/or other functional blocks in computing device 100 for performing operations such as writing data to event queue 116, reading data from event queue 116, finding and relocating event queue 116 in memory 104, determining a size of and resizing event queue 116, monitoring event queue 116, etc. In some embodiments, registers 120 include register(s) for storing a queue address, a queue size, a head pointer, and a tail pointer (these values are described in more detail below).

In some embodiments, communication paths (that include one or more busses, wires, and/or connections) are coupled between the various elements in computing device 100 (processor 102, memory 104, etc.), as shown by arrow-headed lines between the elements. The communication paths are used to transmit commands, data, event notifications, and/or other information between the elements.

Although computing device 100 is described with a particular arrangement of elements/functional blocks, some embodiments include a different number and/or arrangement of elements/functional blocks. For example, some embodiments have multiple processors. As another example, in some embodiments, computing device 100 includes a number of cache memories. As yet another example, in some embodiments, registers 120 are located elsewhere in computing device 100, but usable as described herein. Generally, the described embodiments can use any number or arrangement of functional blocks/elements that can perform the operations herein described.

In addition, although computing device 100 is simplified for illustrative purposes, in some embodiments, computing device 100 includes additional functional blocks/elements for performing the operations herein described and/or other operations. For example, computing device 100 may include power controllers, batteries, media processors, communication mechanisms, networking mechanisms, display mechanisms, etc.

Computing device 100 can be, or can be included in, any electronic device that performs computational operations. For example, computing device 100 can be, or can be included in, electronic devices such as desktop computers, laptop computers, wearable computing devices, tablet computers, smart phones, servers, network appliances, toys, audio-visual equipment, home appliances, controllers, etc., and/or combinations thereof.

Event Queue

As described above, event queue 116 is used to store/buffer IO event notifications forwarded from IO hub 106 (i.e., IOMMU 118 and/or other functional blocks/mechanisms in IO hub 106) so that the event notifications can be retrieved and processed by processor 102. For example, event queue 116 may be used to store event notifications that indicate particular events that have been encountered by IO hub 106 (e.g., the expiration of a counter, a register containing a specified value, a threshold exceeded, events received from IO devices 108-110 and/or on IO interfaces 112, etc.), errors that have been encountered by IO hub 106 (e.g., buffer overflows, specified error conditions encountered, a register containing a specified value, a threshold exceeded, events that occur in IO devices 108-110 and/or on IO interfaces 112, etc.), and/or other event notifications.

Figure 2:
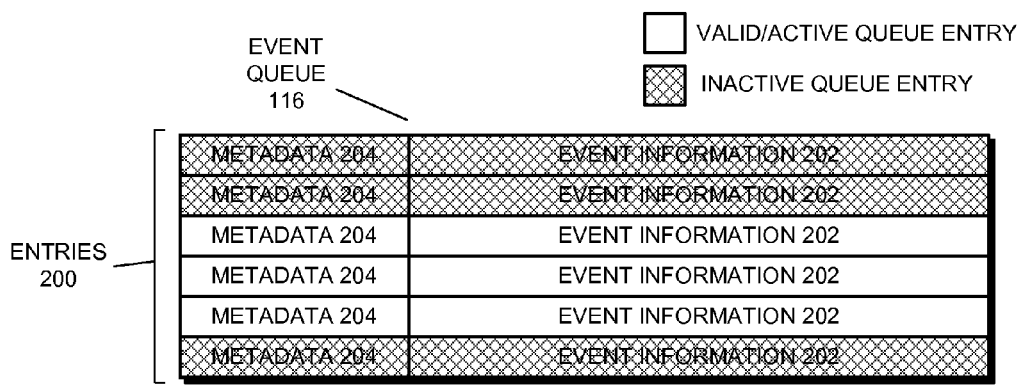
FIG. 2 presents a block diagram illustrating an event queue in accordance with some embodiments.

FIG. 2 presents a block diagram illustrating event queue 116 in accordance with some embodiments. As can be seen in FIG. 2, event queue 116 includes a number of entries 200, each of which includes event information 202 and metadata 204 which, taken together, form an event notification. Event information 202 includes one or more values related to (indicating, associated with, part of, describing, etc.) an event for which the entry 200 holds information. For example, event information 202 may include event codes (e.g., numerical, bitwise, etc.) and operands (e.g., addresses, IO device identifiers, event specifiers, event descriptions, input/output values for processor 102 and/or from IO hub 106, etc.). Metadata 204 includes values relating to the event notification or the entry 200 such as a valid flag, condition fields, event information identifiers, counters/timers, etc.

As shown in FIG. 2, some entries in event queue 116 are "inactive," while other entries are "valid" or "active." In some embodiments, the number of event notifications stored in event queue 116 varies over time as events (particular events, errors, etc.) occur in IO hub 106 and are written to event queue 116 and as processor 102 reads the event notifications from event queue 116 and processes the event notifications. Valid or active entries 200 in event queue 116 hold event notifications awaiting reading/processing by processor 102. Inactive entries 200 in event queue 116 do not presently hold event notifications awaiting reading/processing by processor 102. In some embodiments, valid/active entries 200 can be distinguished from inactive entries 200 by a valid flag in metadata 204 in each entry 200. In these embodiments, when the valid flag is "set" to a predetermined value (1, A, 0, etc.), the entry 200 is valid/active, and when the valid flag is not set to the predetermined value, the entry 200 is inactive. As described below, some embodiments use the valid flag to perform processing of event notifications after event queue 116 has been relocated.

During operation, when an event occurs in IO hub 106 (IOMMU 118 and/or other functional blocks in IO hub 106), IO hub 106 writes a corresponding event notification (including event information 202 and metadata 204) in event queue 116 (and thus IO hub 106/IOMMU 118 are "write mechanisms"). For example, IO hub 106 may use a tail pointer that indicates a next available entry 200 in event queue 116 (as described in more detail below) to perform a memory write operation that stores the event notification in the next available entry 200 in event queue 116. Processor 102 separately proceeds through event queue 116, using a head pointer to read the event notification in each entry 200 (also described in more detail below), processing the event notification (i.e., handling the particular event, error, memory access issue, etc. in the event notification accordingly), and advancing the head pointer until eventually reading and processing the above-described event notification.

In some embodiments, event queue 116 is a first-in-first-out (FIFO) queue with entries consecutively located in memory 104 from a starting address. For example, for an event queue with 16-byte entries 200, a first entry 200 in event queue 116 may be located starting at address X of memory 104, a second entry may be located starting at address X+16 bytes, a third entry may be located starting at address X+32 bytes, and so forth. In these embodiments, event queue 116 may be a circular queue, so that upon reaching a last entry 200 in event queue 116, a next entry is the first entry in event queue 116. Note, however, alternative embodiments can use any arrangement of event queue 116 that can perform the operations herein described. For example, in some embodiments, event queue 116 may be a linked list, a last-in-first-out (LIFO) queue, etc.

Although embodiments are described using event queue 116, in some embodiments, a different type of queue is operated on. For example, in some embodiments, a PPR queue can be used, the PPR queue storing notifications of memory access issues encountered by JO hub 106 (e.g., JO memory access page faults, etc.). Generally, the described operations can be performed using a queue that is stored in memory 104 that holds any type of data.

Additionally, although event information 202 and metadata 204 are described as including certain information, in alternative embodiments, event information 202 and metadata 204 include at least some different information. For example, in some embodiments, event information 202 includes a value that is used as the valid flag (and thus metadata 204 does not include the valid flag). For instance, in some of these embodiments, event information 202 includes event code bit(s) that are used by processor 102 (and/or other readers) to determine the type/nature of the event to which event information 202 pertains. When these one or more bits include values in a predetermined set of values in these embodiments (e.g., non-zero values), it can be determined that the entry 200 in event queue 116 is valid (and thus includes an event notification that is to be processed). In this way, in these embodiments, the event code bits in event information 202 perform the function of the valid flag.

Registers with Values Associated with the Event Queue

Figure 3:
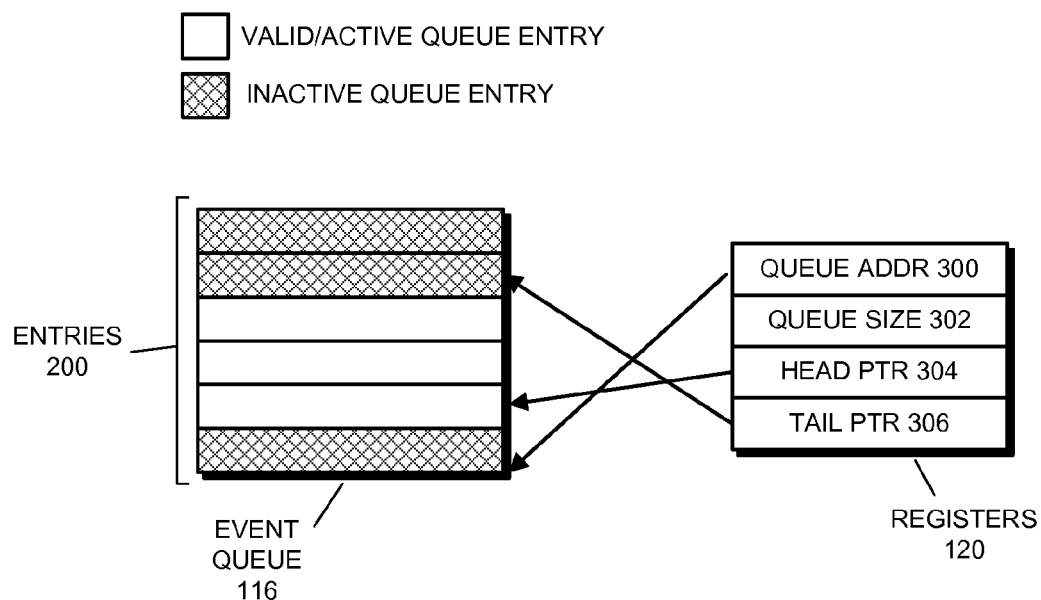
FIG. 3 presents a block diagram illustrating registers associated with an event queue in accordance with some embodiments.

As described above, IOMMU 118 includes a set of registers 120 that are used for performing operations involving event queue 116. Generally, the value in each of the registers in registers 120 describes, defines, or is otherwise associated with a corresponding aspect of event queue 116. FIG. 3 presents a block diagram illustrating registers 120 in accordance with some embodiments. As can be seen in FIG. 3, registers 120 include registers for storing values for queue address 300 ("QUEUE ADDR 300"), queue size 302, head pointer 304 ("HEAD PTR 304"), and tail pointer 306 ("TAIL PTR 306").

Queue address 300 is a value that indicates a location where event queue 116 is stored in memory 104. Generally, it is not required that event queue 116 always be stored in a single, set location in memory 104 (i.e., does not necessarily always appear at the same location in memory 104). Queue address 300 is therefore used by functional blocks in computing device 100 (i.e., processor 102, IOMMU 118, etc.) for determining where event queue 116 is currently located in memory 104. The value stored in queue address 300 can be any value that directly or indirectly represents a location in memory 104. For example, queue address 300 can store one or more of an absolute or relative address of a first, last, or middle entry of event queue 116, an offset from a known address value of a given entry in event queue 116, a predetermined location indicator, etc. As can be seen in the embodiment shown in FIG. 3, queue address 300 includes a pointer (shown as an arrow) that indicates a starting address of event queue 116. The pointer may be an actual address such as an N-bit address (where N depends on the addressing scheme used in computing device 100) or another value.

Queue size 302 is a value that indicates a size of event queue 116 in memory 104. Generally, it is not required that event queue 116 always be a single, fixed size (e.g., number of bytes, number of entries, etc.). Queue size 302 is therefore used by functional blocks in computing device 100 to determine the present size of event queue 116. The value stored in queue size 302 can be any value that directly or indirectly represents a size of event queue 116. For example, the value can be a number that represents a number of fixed-size entries in event queue 116, a number of bytes in memory 104 used for storing event queue 116 (which can be used to determine a number of fixed-size entries that are present in event queue 116), etc. Note that, when used in conjunction with queue address 300, queue size 302 can be used to determine a location of and number of fixed-size entries in event queue 116, and thus to characterize a current event queue 116.

Head pointer 304 is a value that indicates an entry 200 in event queue 116 that should be read the next time data is to be read from an entry 200 in event queue 116. Generally, data may be read from entries 200 in event queue 116 in a corresponding pattern (event queue 116 is described as a circular FIFO queue herein, although other access patterns may be used) and so reading may occur from any of the entries 200 in event queue 116. Head pointer 304 is therefore used to determine a next entry to be read from event queue 116. The value stored in head pointer 304 can be any value that directly or indirectly indicates the next entry 200 from which data is to be read. For example, head pointer 304 can store one or more of an absolute or relative address of an entry 200 in event queue 116, an offset from a known address value, a number or other identifier for an entry 200 in event queue 116, a predetermined location indicator, etc. As can be seen in the embodiment shown in FIG. 3, head pointer 304 includes a pointer (shown as an arrow) that indicates a first valid/active entry 200 in event queue 116 (and a second overall entry 200 in event queue 116). The pointer may be an actual address such as an M-bit address (where M depends on the addressing scheme used in computing device 100) or another value.

Tail pointer 306 is a value that indicates an entry 200 in event queue 116 that should be written the next time data is to be written to an entry 200 in event queue 116. Generally, data may be written to entries 200 in event queue 116 in a corresponding pattern and so writing may occur to any of the entries 200 in event queue 116. Tail pointer 306 is therefore used to determine a next entry to be written to in event queue 116. The value stored in tail pointer 306 can be any value that directly or indirectly indicates the next entry 200 to which data is to be written. For example, tail pointer 306 can store one or more of an absolute or relative address of an entry 200 in event queue 116, an offset from a known address value, a number or other identifier for an entry 200 in event queue 116, a predetermined location indicator, etc. As can be seen in the embodiment shown in FIG. 3, tail pointer 306 includes a pointer (shown as an arrow) that indicates a last valid/active entry 200 in event queue 116 (and a fourth overall entry 200 in event queue 116). The pointer may be an actual address such as an M-bit address (where M depends on the addressing scheme used in computing device 100) or another value.

Figure 4:
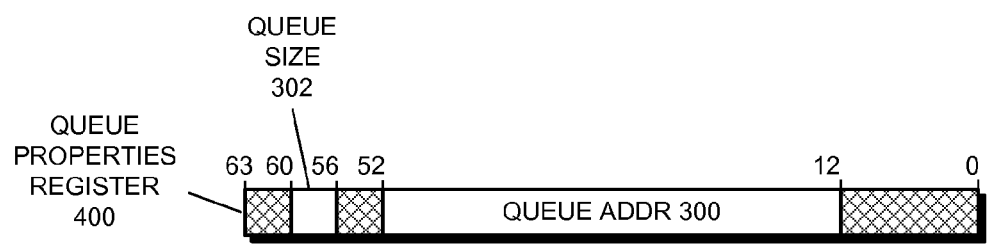
FIG. 4 presents a block diagram illustrating a queue properties register that is used to hold both a queue address and a queue size in accordance with some embodiments.

Although an embodiment is shown in FIG. 3 in which queue address 300 and queue size 302 are stored in separate registers, in some embodiments a single register may be used to both store queue address 300 and queue size 302. For example, FIG. 4 presents a block diagram illustrating a queue properties register 400 that is used to hold both queue address 300 and queue size 302 in accordance with some embodiments. As can be seen in FIG. 3, queue properties register 400 is a 64-bit register with 4 bits used for storing queue size 302 and 40 bits reserved for storing queue address 300. Note that 40 bits may be used for queue address 300 because, in some embodiments, event queue 116 is byte-aligned, meaning 40 bits are combined with some predetermined set of address bits (e.g., zeros for a lower set of address bits) to arrive at an address for event queue 116 (in some embodiments, a different number of bits is used for queue address 300). In some embodiments, holding both queue address 300 and queue size 302 helps with the atomic write of both values (as only one register is being written).

Although certain registers and values are shown in FIG. 3, in some embodiments, other numbers or types of registers and/or values are used. Generally, the described embodiments include sufficient values and/or registers to perform the operations herein described.

Software Entities

Figure 5:
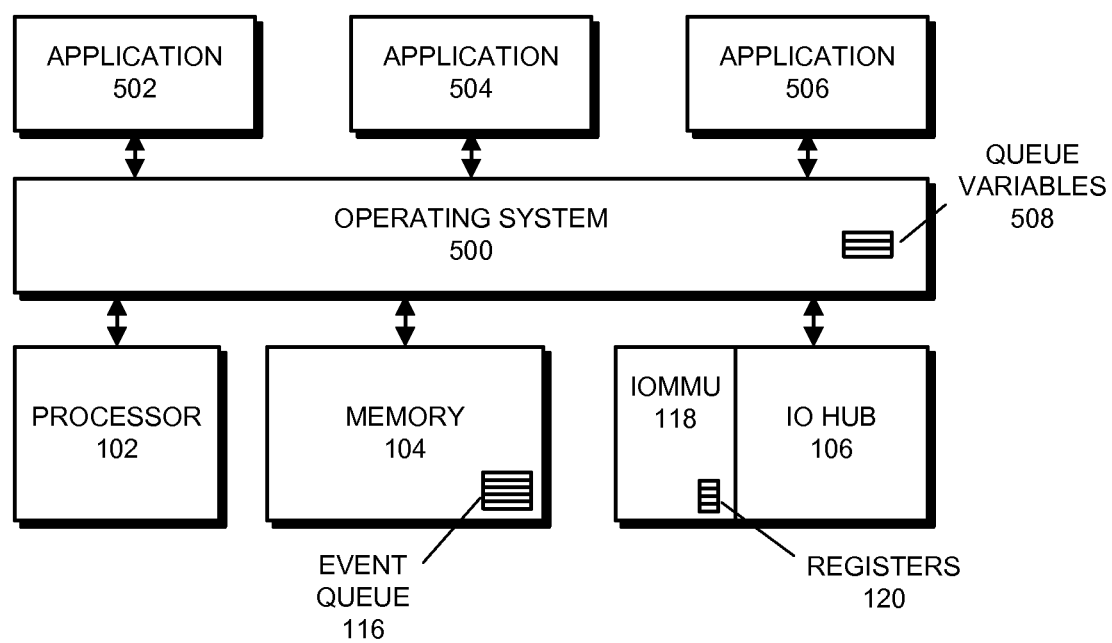
FIG. 5 presents a block diagram illustrating software entities in accordance with some embodiments.

In some embodiments, one or more software entities executed by processor 102 in computing device 100 may cause processor 102 to perform operations for relocating and/or resizing event queue 116. FIG. 5 presents a block diagram illustrating software entities in accordance with some embodiments. As shown in FIG. 5, the software entities include operating system 500 and applications 502-506.

Generally, operating system 500 serves as an intermediary between system hardware in computing device 100 (e.g., processor 102, IO hub 106, etc.) and applications executed by processor 102, such as applications 502-506 (which can be, for example, an system monitoring application, a web browser, and a game application). For example, operating system 500 can be, but is not limited to being, the OS X operating system from Apple Inc. of Cupertino, Calif.; the FreeBSD operating system from The FreeBSD Foundation of Boulder, Colo.; or another operating system. Operating systems and their general functions are known in the art and hence are not described in detail (aside from operations relating to event queue 116).

In some embodiments, operating system 500 includes a software entity (routine, daemon, or other software entity) that is configured to read event notifications from event queue 116 in a corresponding pattern (FIFO, etc.) and process the event notifications. In this way, operating system 500 handles events that are produced by IOMMU 118 (and, more generally, IO hub 106). In these embodiments, and as shown in FIG. 5, operating system 500 (i.e., the software entity in operating system 500) may maintain queue variables 508 such as a head pointer that is a local copy of the value in the corresponding registers that are used for reading event notifications from event queue 116. Note that, although operating system 500 is described herein as "reading" and "processing" event notifications, in actuality, the reading and processing is performed by processor 102 under the control of program code for the software entity in operating system 500 and possibly using queue variables 508 (as versus using the actual values in registers 120).

In some embodiments, operating system 500 includes a software entity (routine, daemon, or other software entity) that is configured to monitor, relocate, and/or resize event queue 116. For example, in some embodiments, operating system 500 includes a system performance monitoring daemon that is configured to increase and/or reduce the amount of memory in memory 104 used for holding event queue 116 based on the level of business of processor 102, operating state, etc. of computing device 100 (or some portion thereof). In these embodiments, the performance monitoring daemon may monitor metrics such as one or more of the number of IO events being produced, the number of IO operations being performed, the number of active and/or likely active IO devices coupled to the system, the type of operations being performed in processor 102, etc. to determine when the size of event queue 116 should be increased (as event queue 116 becomes more likely to need more than a current number of entries for holding IO event notifications) or decreased (as event queue 116 becomes less likely to need a current number of entries 200 for holding IO event notifications). In these embodiments, queue variables 508 may be used by the performance monitoring daemon for keeping track of a size and location of event queue 116.

Although in the embodiment shown in FIG. 5, operating system 500 (or a software entity in operating system 500) maintains queue variables 508, in some embodiments, another software entity maintains queue variables 508. For example, in some embodiments, an application such as a system monitoring application and/or an event processing application can maintain queue variables 508 such as a head pointer, a queue address, and/or a queue size that are local copies of the values in the corresponding registers that are used by the application for keeping track of a size and location of event queue 116 and/or for reading event notifications from event queue 116. In these embodiments, operating system 500 may not maintain queue variables 508.

Relocating a Queue

Figure 6:
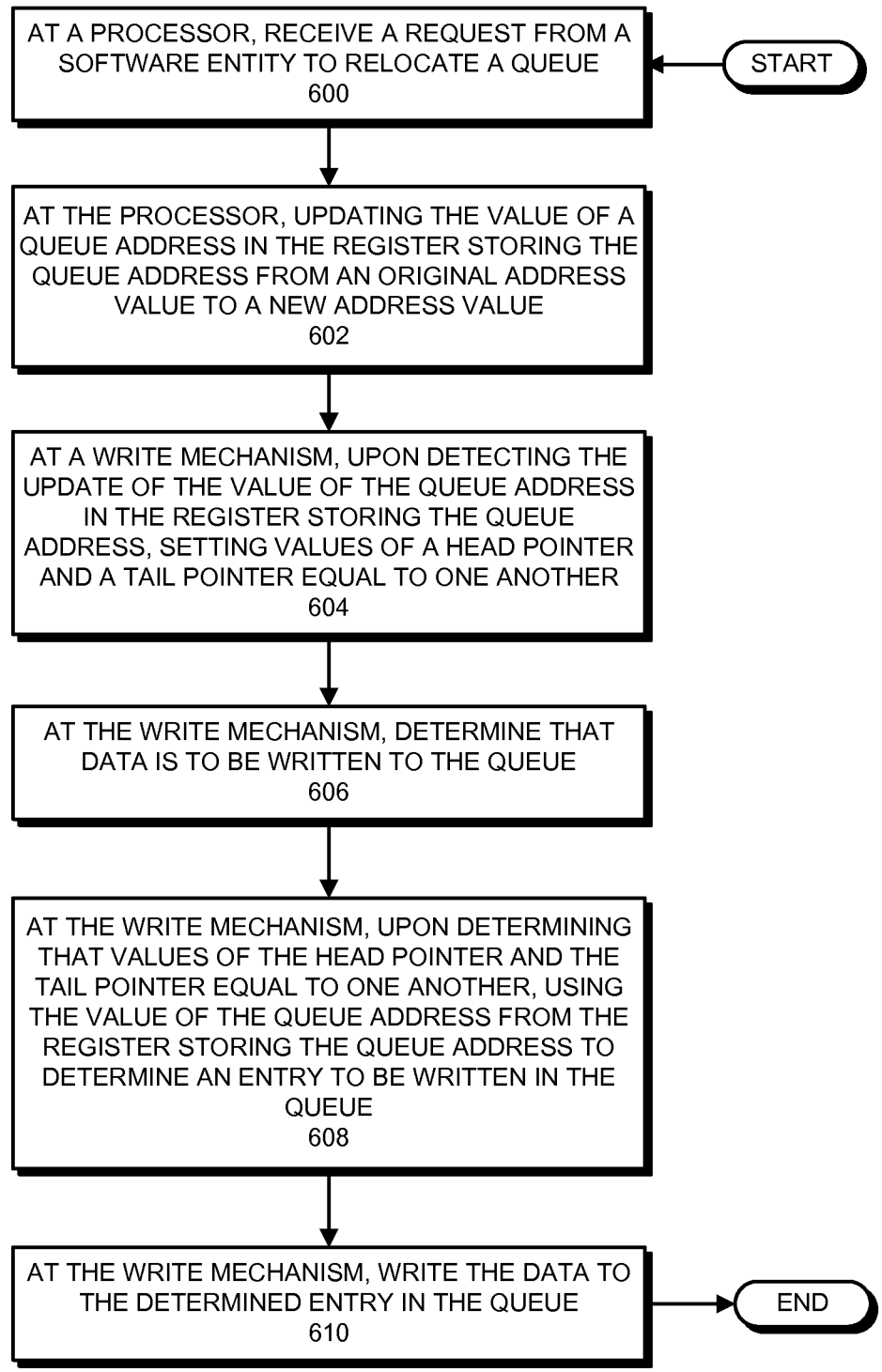
FIG. 6 presents a flowchart illustrating a process for relocating a queue in accordance with some embodiments.

FIG. 6 presents a flowchart illustrating a process for relocating a queue in accordance with some embodiments. More specifically, during the process shown in FIG. 6, event queue 116 is moved from an original location in memory 104 to a new location in memory 104. Note that the operations shown in FIG. 6 are presented as a general example of operations performed by some embodiments. The operations performed by other embodiments include different operations and/or operations that are performed in a different order. Additionally, although certain mechanisms are used in describing the operations (e.g., processor 102, a software entity, IOMMU 118, etc.), in some embodiments, other mechanisms perform the operations.

Recall that IOMMU 118 (and, more generally, IO hub 106) writes event notifications to event queue 116 and thus can generally be regarded as a "writer" of event queue 116 or a "write mechanism" that writes to event queue 116 (as can other functional blocks that write to event queue 116). For FIG. 6, IOMMU 118 is therefore interchangeably referred to as a write mechanism. Additionally recall that processor 102 reads event notifications from event queue 116 and thus can generally be regarded as a "reader" of event queue 116 or a "read mechanism" that reads from event queue 116 (as can other functional blocks that read from event queue 116).

The process shown in FIG. 6 starts when processor 102 receives, from a software entity in computing device 100, a request to relocate event queue 116 (step 600). For this operation, processor 102 may execute program code from a software entity such as a performance monitoring daemon in operating system 500, an application 502-506, etc. and/or encounter some other form of request (e.g., a register in processor 102 set to a predetermined value while executing program code, etc.) that causes processor 102 to relocate event queue 116. In some embodiments, the software entity monitors operations being performed in computing device (computational operations being performed in processor 102, IO operations being performed, memory accesses being performed, etc.), operating conditions (power consumption, average event queue 116 use/fullness, etc.), and/or other indications of computing device 100 operations and, based on the monitored operations, determines that event queue 116 should be relocated from the original location in memory 104 to the new location in memory 104. For example, the software entity can determine that event queue 116 has been accessed more than a given number of times in a predetermined period of time and thus should be moved to a particular physical location in memory 104.

Processor 102 then updates queue address 300 in the corresponding register in registers 120 from an original address value to a new address value (step 602). As described above, queue address 300 is an address that directly or indirectly indicates the location of event queue 116 in memory 104. During the update operation, processor 102 overwrites the original value of queue address 300 with the new address value, which causes readers and writers in computing device 100 to use the new address to directly or indirectly determine the location of event queue 116 in memory 104. As used herein, "directly" indicating the location means that the queue address 300 is an address (or another value) that can be used alone in determining a location in memory 104 of event queue 116. For example, the queue address 300 may be a 64-bit address of a first entry 200 in event queue 116. In contrast, as used herein, "indirectly" indicating the location means that the queue address 300 is an address that can be used in combination with another value in determining a location in memory 104 of event queue 116. For example, the queue address 300 may be a 32-bit offset from a known address that can be used to compute an address of a first entry 200 in event queue 116. Note that, for this operation, processor 102 atomically updates the value of the queue address 300, so that no other hardware or software entity in computing device 100 is able to read the original value of queue address 300 until the updating operation is complete. For example, processor 102 can obtain a lock on the register during the update, block reads of the register, etc.

Upon detecting the update of the value of the queue address 300, IOMMU 118 sets the value of the head pointer 304 equal to tail pointer 306 (step 604). When performing this operation, IOMMU 118 may set both pointers equal to a predetermined value such as 0, NULL, 9, or another value. Note that, for these operations, a software reader of event queue 116 has caused processor 102 to perform an update of the value of queue address 300 and a hardware write mechanism (functional block), IOMMU 118, has responsively updated the head pointer and the tail pointer.

In some embodiments, writes to event queue 116 are blocked or otherwise avoided between (and during) steps 602 and 604, so that both updates are performed atomically. This enables these embodiments to update the values associated with event queue 116 without having erroneous writes to the original location of the queue that should be written to the new location of event queue 116.

IOMMU 118 subsequently determines that an event notification (i.e., data) is to be written to event queue 116 (step 606). For example, IOMMU 118 may determine that an event has occurred for which processor 102 is to receive notification, is to process related data, etc. Depending on the embodiment, the event notification can be anything from simple information communication (i.e., informing processor 102 that the event has occurred) to a notification of an IO fault or error that is to be processed by processor 102.

When writing an event notification to event queue 116, IOMMU 118 first compares tail pointer 306 to head pointer 304 to determine if the pointers are equal. If the pointers are not equal, IOMMU 118 writes data to an entry 200 of event queue 116 indicated by tail pointer 306. Otherwise, when the pointers are equal, it is a sign that the queue has been newly established in a location in memory 104 (initialized or relocated). IOMMU 118 therefore uses (instead of the tail pointer 306), queue address 300 to determine a first entry 200 in event queue 116, which is the entry 200 to be written in event queue 116 (step 608). IOMMU 118 then writes the event notification to the determined entry 200 in event queue 116 (step 610). Note that, in some embodiments, writing the event notification includes writing event information 202 and metadata 204 to the determined entry 200 in event queue 116.

Although not shown in FIG. 6, after writing the event notification to event queue 116, IOMMU 118 advances tail pointer 306 to a next entry 200 in event queue 116. This configures tail pointer 306 so that the next writer to write to event queue writes in an appropriate entry 200 in event queue 116.

Figure 11:
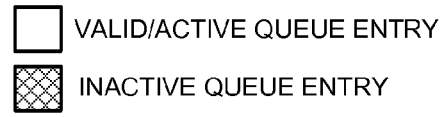
FIG. 11 presents a block diagram illustrating an event queue and registers associated with the event queue before and after the relocation of the event queue in accordance with some embodiments.
Figure 11:
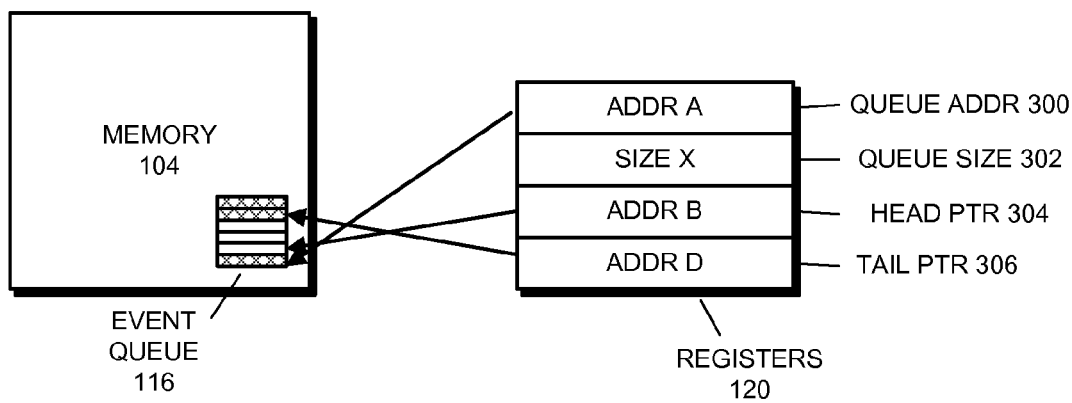
Figure 11:
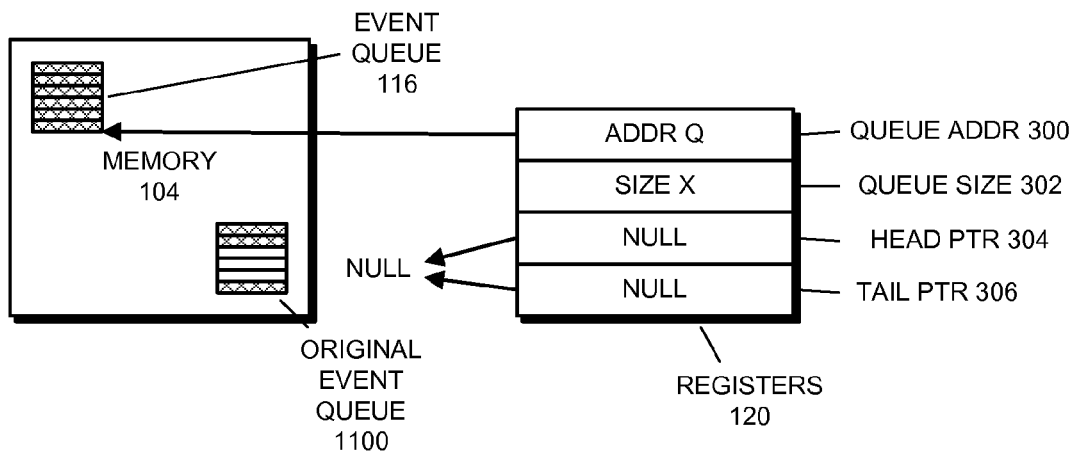

FIG. 11 presents a block diagram illustrating event queue 116 and registers 120 before and after the relocation of event queue 116 such as is described in FIG. 6 in accordance with some embodiments. As can be seen in FIG. 11, before event queue 116 is relocated, queue address 300 stores a value of address A (i.e., a starting address in memory 104 for event queue 116), queue size 302 stores a value of size X (e.g., a number of fixed-size entries, a number of bytes, and/or another value), head pointer 304 stores a value of address B (i.e., an address of a next entry 200 to be read from in event queue 116), and tail pointer 306 stores a value of address E (i.e., an address of a next entry 200 to be written to in event queue 116). As can be seen, there are a number of valid and invalid entries 200 in event queue 116 before event queue 116 is relocated in memory 104.

After the relocation of event queue 116, queue address 300 stores a value of address Q (i.e., a starting address in memory 104 for event queue 116), queue size 302 stores a value of size X, head pointer 304 stores a value of NULL, and tail pointer 306 stores a value of NULL. Thus, event queue 116 appears to write mechanisms/writers and read mechanisms/readers to be a newly initialized event queue 116 at address Q—and is written to and read from accordingly. Note that, because event queue 116 appears as a newly initialized queue, the entries 200 in event queue 116 are invalid (awaiting the writing of new event notifications).

As can be seen in FIG. 11, original event queue 1100 is still present in memory 104. The remaining valid entries 200 in original event queue 1100 are read and processed from this location by processor 102 as described herein before the memory occupied by original event queue 1100 is freed.

Relocating and Resizing a Queue

Figure 7:
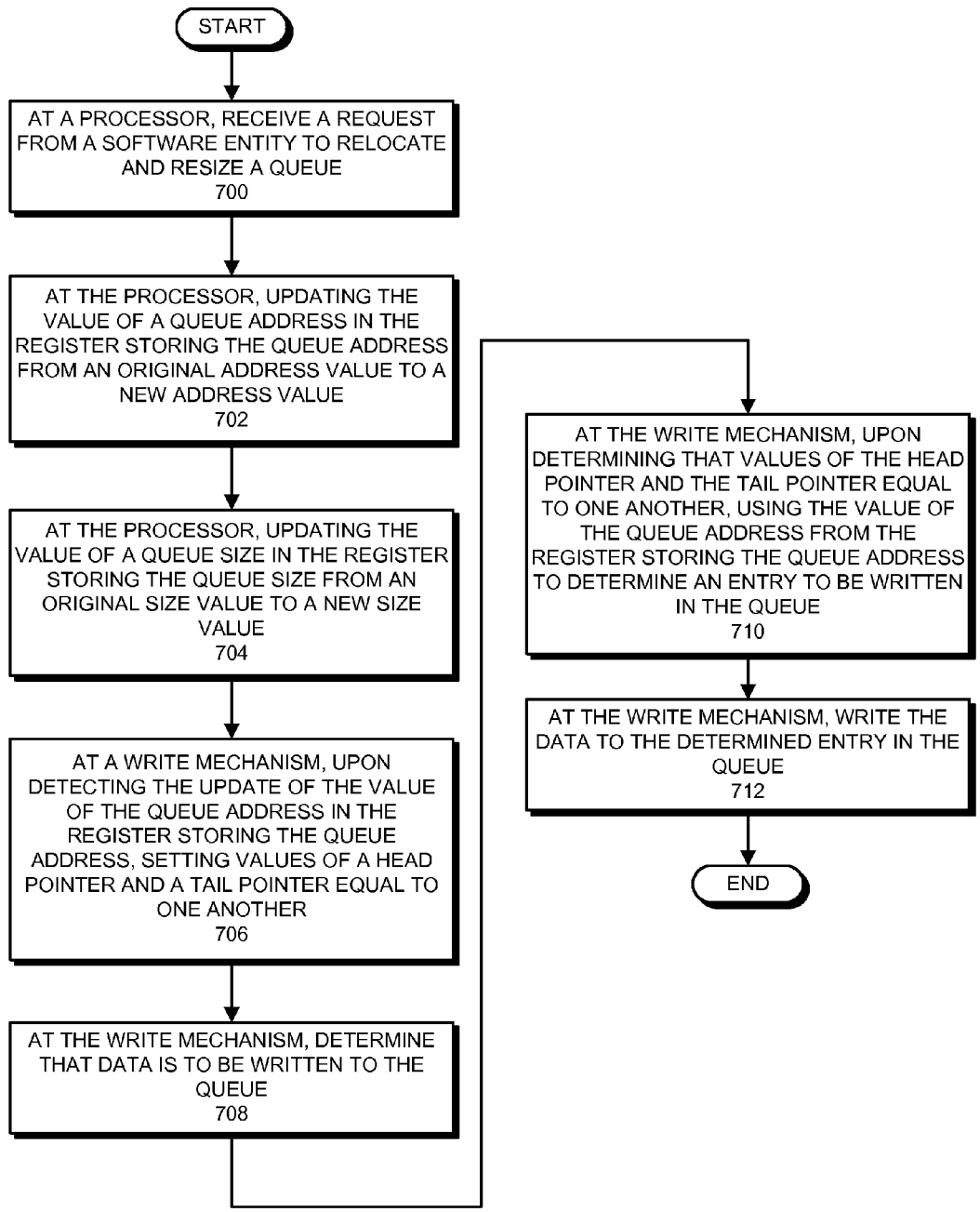
FIG. 7 presents a flowchart illustrating a process for relocating and resizing a queue in accordance with some embodiments.

FIG. 7 presents a flowchart illustrating a process for relocating and resizing a queue in accordance with some embodiments. More specifically, during the process shown in FIG. 7, event queue 116 is moved from an original location in memory 104 to a new location in memory 104 and resized from an original size to a new size. Note that the operations shown in FIG. 7 are presented as a general example of operations performed by some embodiments. The operations performed by other embodiments include different operations and/or operations that are performed in a different order. Additionally, although certain mechanisms are used in describing the operations (e.g., processor 102, a software entity, IOMMU 118, etc.), in some embodiments, other mechanisms perform the operations.

Recall that IOMMU 118 (and, more generally, IO hub 106) writes event notifications to event queue 116 and thus can generally be regarded as a "writer" of event queue 116 or a "write mechanism" that writes to event queue 116 (as can other functional blocks that write to event queue 116). For FIG. 7, IOMMU 118 is therefore interchangeably referred to as a write mechanism. Additionally recall that processor 102 reads event notifications from event queue 116 and thus can generally be regarded as a "reader" of event queue 116 or a "read mechanism" that reads from event queue 116 (as can other functional blocks that read from event queue 116).

The process shown in FIG. 7 starts when processor 102 receives, from a software entity in computing device 100, a request to relocate and resize event queue 116 (step 700). For this operation, processor 102 may execute program code from a software entity such as a performance monitoring daemon in operating system 500, an application 502-506, etc. and/or encounter some other form of request (e.g., a register in processor 102 set to a predetermined value while executing program code, etc.) that causes processor 102 to relocate and resize event queue 116. In some embodiments, the software entity monitors operations being performed in computing device (computational operations being performed in processor 102, IO operations being performed, memory accesses being performed, etc.), operating conditions (power consumption, average event queue 116 use/fullness, etc.), and/or other indications of computing device 100 operations and, based on the monitored operations, determines that event queue 116 should be relocated from the original location in memory 104 to the new location in memory 104 and resized from the original size to the new size. For example, the software entity can determine that event queue 116 has been less than a threshold amount full for a predetermined period of time and thus event queue 116 should be moved to the new location in memory 104 and reduced in size (i.e., to include fewer entries 200).

Processor 102 then updates queue address 300 in the corresponding register in registers 120 from an original address value to a new address value (step 702). As described above, queue address 300 is an address that directly or indirectly indicates the location of event queue 116 in memory 104. During the update operation, processor 102 overwrites the original value of queue address 300 with the new address value, which causes readers and writers in computing device 100 to use the new address to directly or indirectly determine the location of event queue 116 in memory 104. Note that, for this operation, processor 102 atomically updates the value of the queue address 300, so that no other hardware or software entity in computing device 100 is able to read the original value of queue address 300 during the updating operation.

Processor 102 also updates queue size 302 in the corresponding register in registers 120 from an original size value to a new size value (step 704). As described above, queue size 302 can be any value that directly or indirectly represents a size of event queue 116. During the update operation, processor 102 overwrites the original value of queue size 302 with the new size value, which causes computing device 100 to use the new size value to directly or indirectly determine the size of event queue 116 in memory 104. For example, if the original event queue 116 had 64 C-bit entries with a corresponding queue size 302, the new event queue 116 may have 32 C-bit entries with the new queue size 302 being half of the original queue size 302. Note that, processor 102 performs operations 702 and 704 atomically, so that no other hardware or software entity in computing device 100 is able to read the original value of queue address 300 and/or queue size 302 during the updating operation. As described in FIG. 4, in some embodiments, this includes updating a single register that includes both queue address 300 and queue size 302.

Upon detecting the update of the value of the queue address 300, IOMMU 118 sets the value of the head pointer 304 equal to tail pointer 306 (step 706). When performing this operation, IOMMU 118 may set both pointers equal to a predetermined value such as 0, NULL, 9, or another value. Note that, for these operations, a software reader of event queue 116 has caused processor 102 to perform an update of the value of queue address 300 and a hardware write mechanism (functional block), IOMMU 118, has responsively updated the head pointer and the tail pointer.

In some embodiments, writes to event queue 116 are blocked or otherwise avoided during steps 702-706, so that the updating and the setting are performed atomically. This enables these embodiments to update the values associated with event queue 116 without having erroneous writes to the original location of the queue that should be written to the new location of event queue 116.

IOMMU 118 subsequently determines that an event notification (i.e., data) is to be written to event queue 116 (step 708). For example, IOMMU 118 may determine that an event has occurred for which processor 102 is to receive notification, is to process related data, etc. Depending on the embodiment, the event notification can be anything from simple information communication (i.e., informing processor 102 that the event has occurred) to a notification of an JO fault or error that is to be processed by processor 102.

When writing an event notification to event queue 116, IOMMU 118 first compares tail pointer 306 to head pointer 304 to determine if the pointers are equal. If the pointers are not equal, IOMMU 118 writes data to an entry 200 of event queue 116 indicated by tail pointer 306. Otherwise, when the pointers are equal, it is a sign that the queue has been newly established in a location in memory 104 (initialized or relocated). IOMMU 118 therefore uses (instead of the tail pointer 306), queue address 300 to determine a first entry 200 in event queue 116, which is the entry 200 to be written in event queue 116 (step 710). IOMMU 118 then writes the event notification to the determined entry 200 in event queue 116 (step 712). Note that, in some embodiments, writing the event notification includes writing event information 202 and metadata 204 to the determined entry 200 in event queue 116.

Although not shown in FIG. 7, after writing the event notification to event queue 116, IOMMU 118 advances tail pointer 306 to a next entry 200 in event queue 116. This configures tail pointer 306 so that the next writer to write to event queue writes in an appropriate entry 200 in event queue 116. In addition, although not shown in FIG. 7, as IOMMU 118 subsequently writes to event queue 116, IOMMU 118 checks queue size 302 to ensure proper use of event queue 116.

Figure 12:
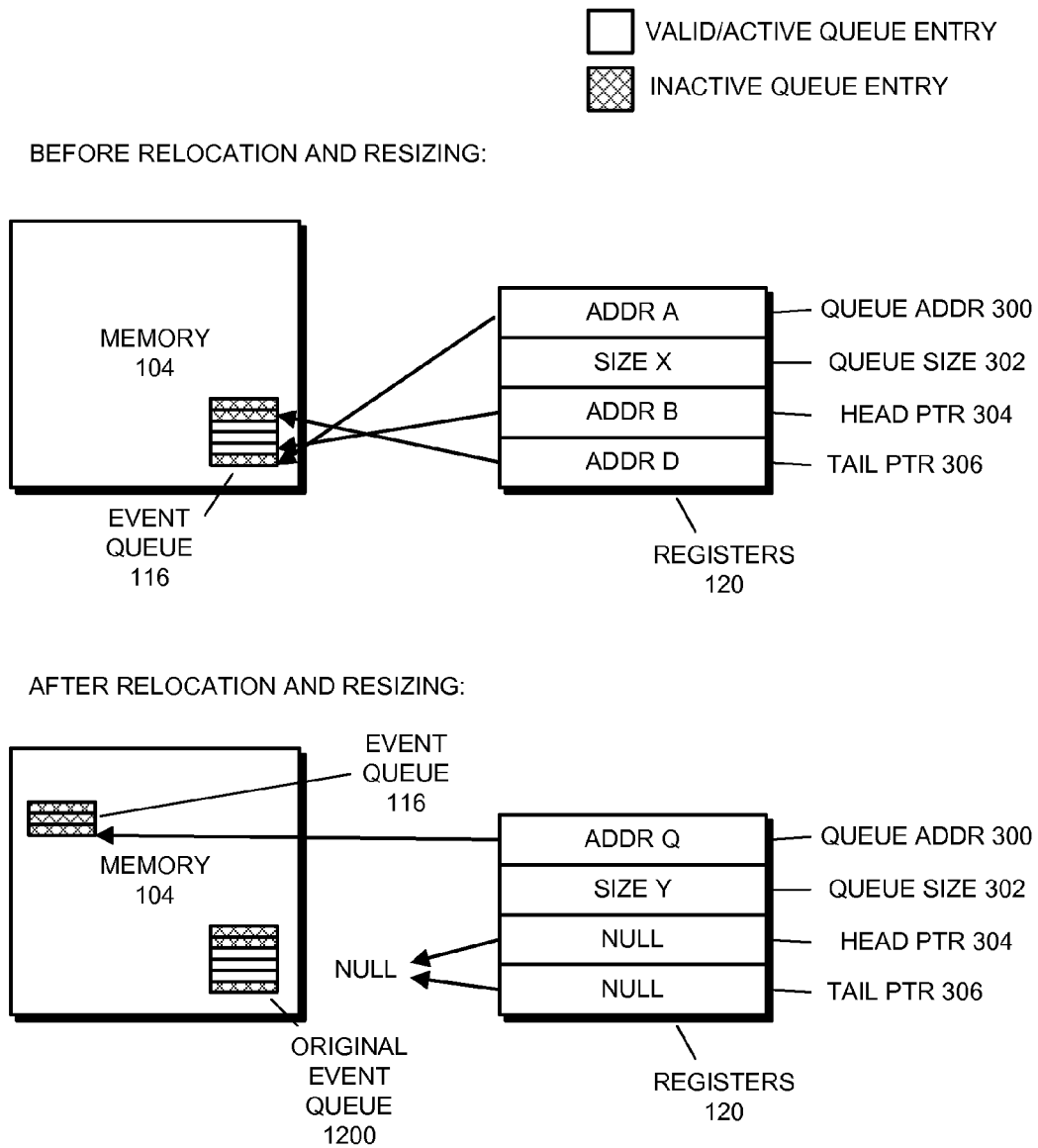
FIG. 12 presents a block diagram illustrating an event queue and registers associated with the event queue before and after the relocation and resizing of the event queue in accordance with some embodiments.

FIG. 12 presents a block diagram illustrating event queue 116 and registers 120 before and after the relocation and resizing of event queue 116 such as is described in FIG. 7 in accordance with some embodiments. As can be seen in FIG. 12, before event queue 116 is relocated, queue address 300 stores a value of address A (i.e., a starting address in memory 104 for event queue 116), queue size 302 stores a value of size X (e.g., a number of fixed-size entries, a number of bytes, and/or another value), head pointer 304 stores a value of address B (i.e., an address of a next entry 200 to be read from in event queue 116), and tail pointer 306 stores a value of address E (i.e., an address of a next entry 200 to be written to in event queue 116). As can be seen, there are a number of valid and invalid entries 200 in event queue 116 before event queue 116 is relocated in memory 104.

After the relocation and resizing of event queue 116, queue address 300 stores a value of address Q (i.e., a starting address in memory 104 for event queue 116), queue size 302 stores a value of size Y (i.e., e.g., a number of fixed-size entries, a number of bytes, and/or another value), head pointer 304 stores a value of NULL, and tail pointer 306 stores a value of NULL. Thus, event queue 116 appears to write mechanisms/writers and read mechanisms/readers to be a newly initialized event queue 116 at address Q of size Y—and is written to and read from accordingly. Note that, because event queue 116 appears as a newly initialized queue, the entries 200 in event queue 116 are invalid (awaiting the writing of any new event notifications). In addition, event queue 116 is shown as being decreased in size in FIG. 12, but event queue 116 may also be increased in size.

As can be seen in FIG. 12, original event queue 1200 is still present in memory 104. The remaining valid entries 200 in original event queue 1200 are read and processed from this location by processor 102 as described herein before the memory occupied by original event queue 1200 is freed.

Resizing a Queue without Relocating the Queue

Figure 8:
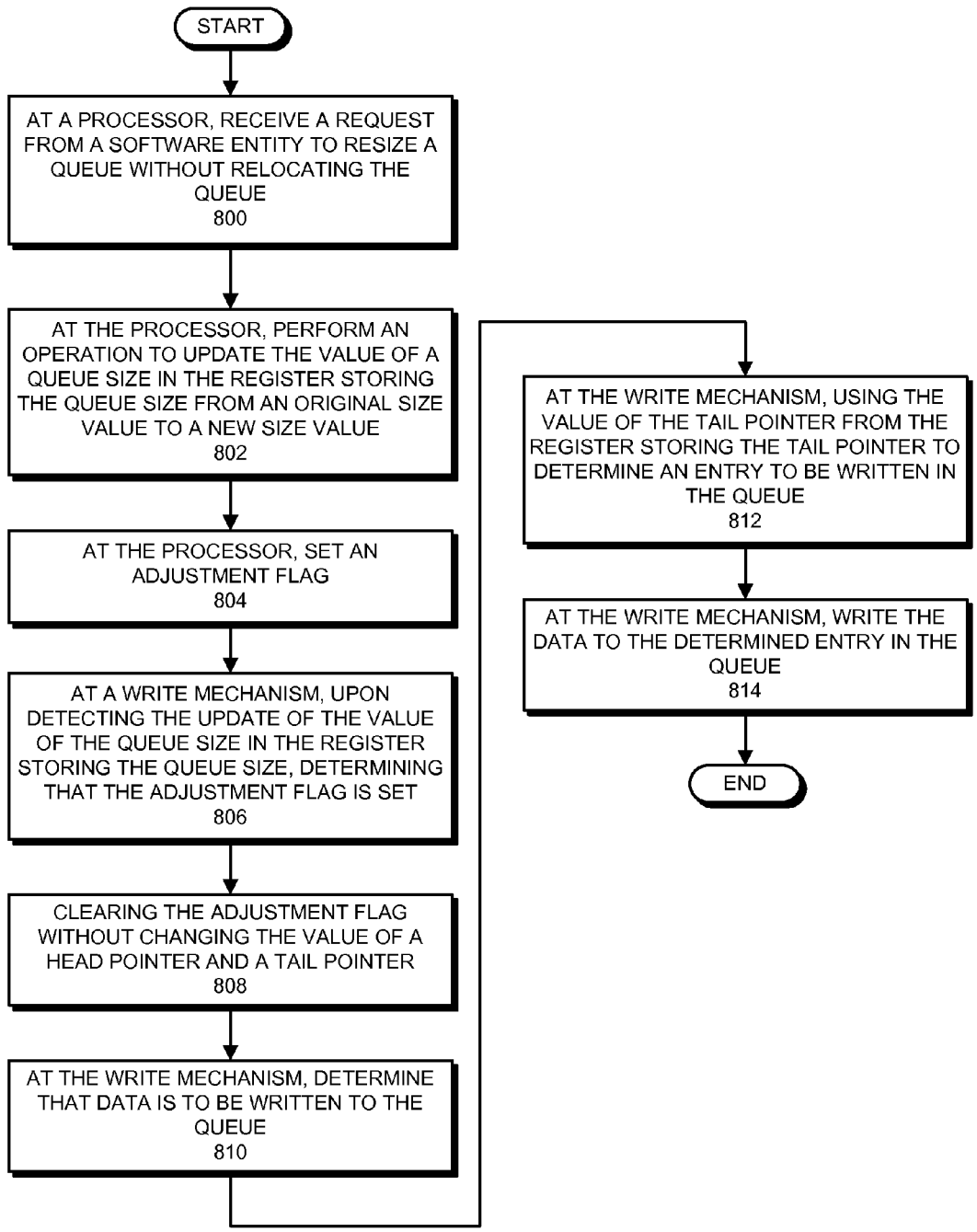
FIG. 8 presents a flowchart illustrating a process for resizing a queue without relocating the queue in accordance with some embodiments.

FIG. 8 presents a flowchart illustrating a process for resizing a queue without relocating the queue in accordance with some embodiments. More specifically, during the process shown in FIG. 8, event queue 116 is resized from an original size to a new size, but a new portion (i.e., set of entries 200) is added to event queue 116 at the original location in memory 104. Note that the operations shown in FIG. 8 are presented as a general example of operations performed by some embodiments. The operations performed by other embodiments include different operations and/or operations that are performed in a different order. Additionally, although certain mechanisms are used in describing the operations (e.g., processor 102, a software entity, IOMMU 118, etc.), in some embodiments, other mechanisms perform the operations.

Recall that IOMMU 118 (and, more generally, IO hub 106) writes event notifications to event queue 116 and thus can generally be regarded as a "writer" of event queue 116 or a "write mechanism" that writes to event queue 116 (as can other functional blocks that write to event queue 116). For FIG. 8, IOMMU 118 is therefore interchangeably referred to as a write mechanism. Additionally recall that processor 102 reads event notifications from event queue 116 and thus can generally be regarded as a "reader" of event queue 116 or a "read mechanism" that reads from event queue 116 (as can other functional blocks that read from event queue 116).

For the operation on event queue 116 in FIG. 8, which is a resize without relocation, in some embodiments, event queue 116 can only be increased in size (i.e., resized to include more entries). This is due to the fact that head pointer 304 and tail pointer 306 are not changed during this operation—and thus may point to entries in the originally-sized event queue 116 that would be lost if event queue 116 was allowed to be decreased in size (i.e., resized to include less entries). In order to decrease the size of event queue 116, event queue 116 should be relocated and resized as described in FIG. 7. Note, however, that event queue 116 can also be moved and increased in size as described in FIG. 7.

The process shown in FIG. 8 starts when processor 102 receives, from a software entity in computing device 100, a request to resize event queue 116 without relocating event queue 116 (step 800). For this operation, processor 102 may execute program code from a software entity such as a performance monitoring daemon in operating system 500, an application 502-506, etc. and/or encounter some other form of request (e.g., a register in processor 102 set to a predetermined value while executing program code, etc.) that causes processor 102 to resize event queue 116 without relocating event queue 116. In some embodiments, the software entity monitors operations being performed in computing device (computational operations being performed in processor 102, IO operations being performed, memory accesses being performed, etc.), operating conditions (power consumption, average event queue 116 use/fullness, etc.), and/or other indications of computing device 100 operations and, based on the monitored operations, determines that event queue 116 should be resized from the original size to the new size without relocating event queue 116. For example, the software entity can determine that event queue 116 has been more than a threshold amount full for a predetermined period of time and thus event queue 116 should be resized to a larger size (i.e., to include more entries 200) without relocating event queue 116 (i.e., with event queue 116 starting from the same location in memory 104).

Processor 102 then updates queue size 302 in the corresponding register in registers 120 from an original size value to a new size value (step 802). As described above, queue size 302 can be any value that directly or indirectly represents a size of event queue 116. During the update operation, processor 102 overwrites the original value of queue size 302 with the new size value, which causes computing device 100 to use the new size value to directly or indirectly determine the size of event queue 116 in memory 104. For example, if the original event queue 116 had 32 C-bit entries with a corresponding queue size 302, the new event queue 116 may have 64 C-bit entries with the new queue size 302 being double the original queue size 302. Note that, processor 102 performs operation 802 atomically, so that no other hardware or software entity in computing device 100 is able to read the original value of queue size 302 during the updating operation.

Processor 102 then sets an adjustment flag (step 804). In some embodiments, the adjustment flag is stored in a register, dedicated memory location, etc. that is accessible to both processor 102 and IOMMU 118. Processor 102 sets the adjustment flag (e.g., to a value such as 1) to inform IOMMU 118 that event queue has been resized without also being relocated, which assists IOMMU 118 in performing subsequent operations.

Upon detecting the update of the value of the queue size 302, IOMMU 118 determines that the adjustment flag is set (step 806). IOMMU 118 then clears the adjustment flag (e.g., sets the adjustment flag to a value such as 0) without changing the value of head pointer 304 or tail pointer 306 (step 808). This means that, unlike the relocation processes shown in FIGS. 6 and 7, IOMMU 118 does not change the pointers when the adjustment flag is set after an in-place resizing of event queue 116. By not changing the value of head pointer 304 and tail pointer 306, IOMMU 118 does not configure the pointers so that IOMMU 118 will use the value of queue address 300 to determine entry 200 to be written the next time an event notification is to be written to event queue 116. Instead, IOMMU 118 leaves the pointers set to whichever entries they indicated, which means that a subsequent write by IOMMU 118 will be made to the entry 200 in event queue 116 indicated by tail pointer 306.

In some embodiments, the updating and setting that are performed during steps 802-804 are performed atomically. This ensures that the new size of event queue 116 is used as the size of event queue 116 by subsequent writers and that pointers are not erroneously changed by IOMMU 118 in the time between when queue size 302 is changed and the adjustment flag is set.

IOMMU 118 subsequently determines that an event notification (i.e., data) is to be written to event queue 116 (step 810). For example, IOMMU 118 may determine that an event has occurred for which processor 102 is to receive notification, is to process related data, etc. Depending on the embodiment, the event notification can be anything from simple information communication (i.e., informing processor 102 that the event has occurred) to a notification of an IO fault or error that is to be processed by processor 102.

When writing an event notification to event queue 116, IOMMU 118 compares tail pointer 306 to head pointer 304 to determine if the pointers are equal. Because the pointers are not equal, IOMMU 118 determines an entry 200 to be written in event queue 116 using tail pointer 306 (step 812) and writes data to the determined entry 200 in event queue 116 (step 814). Note that, in some embodiments, writing the event notification includes writing event information 202 and metadata 204 to the determined entry 200 in event queue 116.

Although not shown in FIG. 8, after writing the event notification to event queue 116, IOMMU 118 advances tail pointer 306 to a next entry 200 in event queue 116. This configures tail pointer 306 so that the next writer to write to event queue writes in an appropriate entry 200 in event queue 116.

In addition, in some embodiments, IOMMU 118 and/or processor 102/software entities use queue size 302 to determine a last entry 200 in event queue 116. In these embodiments, IOMMU 118 uses this determination to, for example, determine when to advance/wrap head pointer 304 and tail pointer 306 from a last entry 200 in event queue 116 to a first entry 200 in event queue 116 (in embodiments that use a circular queue), instead of simply advancing the pointers to the next entry 200 in event queue 116.

Figure 13:
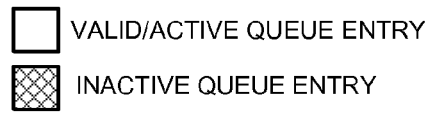
FIG. 13 presents a block diagram illustrating an event queue and registers associated with the event queue before and after resizing of the event queue without relocating event queue in accordance with some embodiments.
Figure 13:
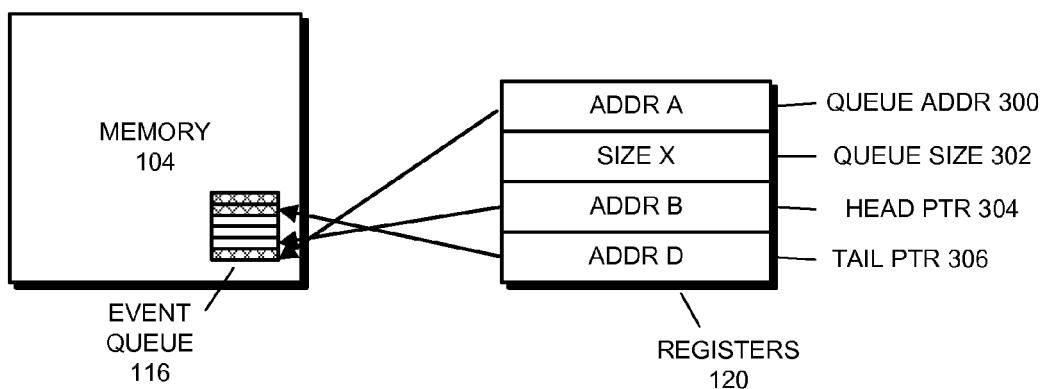
Figure 13:
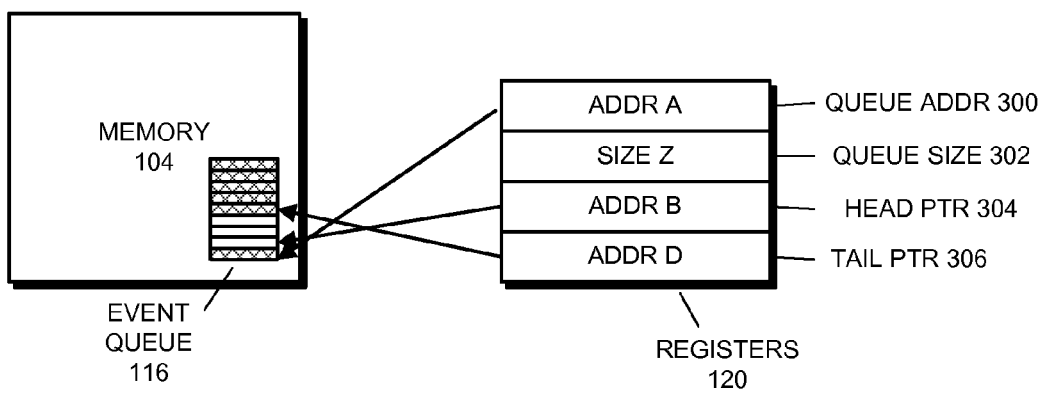

FIG. 13 presents a block diagram illustrating event queue 116 and registers 120 before and after the resizing of event queue 116 without the relocating of event queue 116 such as is described in FIG. 8 in accordance with some embodiments. As can be seen in FIG. 13, before event queue 116 is relocated, queue address 300 stores a value of address A (i.e., a starting address in memory 104 for event queue 116), queue size 302 stores a value of size X (e.g., a number of fixed-size entries, a number of bytes, and/or another value), head pointer 304 stores a value of address B (i.e., an address of a next entry 200 to be read from in event queue 116), and tail pointer stores 306 a value of address E (i.e., an address of a next entry 200 to be written to in event queue 116). As can be seen, there are a number of valid and invalid entries 200 in event queue 116 before event queue 116 is relocated in memory 104 (invalid entries are marked with a cross-hatch pattern in FIG. 13).

After the relocation and resizing of event queue 116, queue address 300 stores a value of address Q (i.e., a starting address in memory 104 for event queue 116), queue size 302 stores a value of size Z (i.e., e.g., a number of fixed-size entries, a number of bytes, and/or another value), head pointer 304 stores a value of address B (i.e., an address of a next entry 200 to be read from in event queue 116), and tail pointer 306 stores a value of address E (i.e., an address of a next entry 200 to be written to in event queue 116). As can be seen, the entries 200 added to event queue 116 during the resizing are invalid entries 200, as they are new entries 200 to which event notifications have not yet been written. Thus, event queue 116 appears to write mechanisms/writers and read mechanisms/readers to be the same event queue 116 at address A, but with a new size of Z—and is written to and read from accordingly.

Writing to and Reading from an Event Queue

Figure 9:
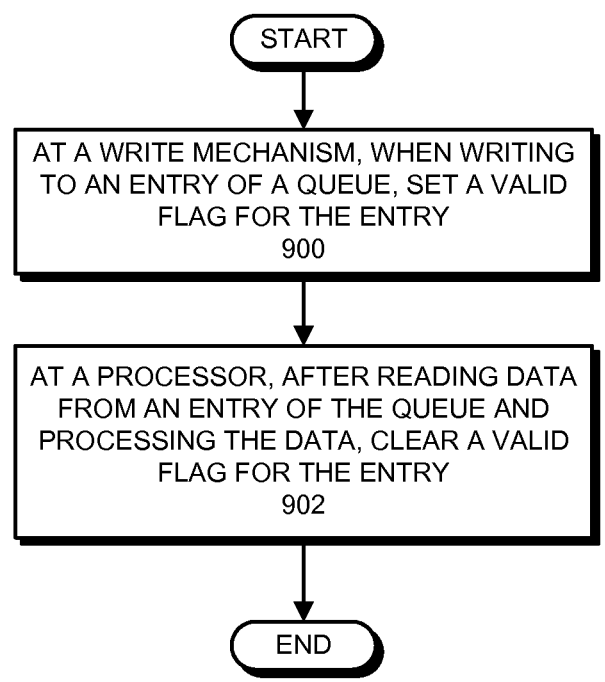
FIG. 9 presents a flowchart illustrating a process for writing to and reading from entries in a queue in accordance with some embodiments.

FIG. 9 presents a flowchart illustrating a process for writing to and reading from entries in a queue in accordance with some embodiments. More specifically, during the process shown in FIG. 9, a write mechanism/writer, IOMMU 118, writes an event notification to an entry 200 in event queue 116 and a read mechanism/reader, processor 102, reads the event notification from the entry 200 in event queue 116. Note that the operations shown in FIG. 9 are presented as a general example of operations performed by some embodiments. The operations performed by other embodiments include different operations and/or operations that are performed in a different order. Additionally, although certain mechanisms are used in describing the operations (e.g., processor 102, a software entity, IOMMU 118, etc.), in some embodiments, other mechanisms perform the operations.

The process shown in FIG. 9 starts when a write mechanism, IOMMU 118, writes an event notification to event queue 116. For example, IOMMU 118 can encounter predetermined operating condition such as a buffer overflow and can write a corresponding event notification to event queue 116. During the write operation, IOMMU 118 uses either tail pointer 306 or queue address 300 (when tail pointer 306 is equal to head pointer 304, as described for, e.g., FIGS. 6-7) to determine an entry 200 in event queue 116 to which the event notification is to be written. IOMMU 118 then performs a memory write operation to memory 104 to write the event notification to the determined entry 200 by writing corresponding data to event information 202 and metadata 204. As part of the write operation, IOMMU 118 sets a valid flag for the entry 200 (step 900). Depending on the embodiment, setting the valid flag can include setting a bit in metadata 204, updating event code bit(s) in event information 202, and/or setting other bits in the entry 200 or otherwise associated with the entry 200. Note that IOMMU 118, as part of the write operation, also updates/advances tail pointer 306 to a next entry in event queue 116.

By setting the valid flag as described, these embodiments mark the entry as a valid entry. In some embodiments, once so marked, the entry should eventually be read and processed by a read mechanism/reader such as processor 102.

At some later point in time, upon request by a software entity such as operating system 500, application 502, etc., a read mechanism, processor 102, reads the data from the above-described entry 200. For example, processor 102 can execute an event-processing routine in operating system 500 that causes processor 102 to read and process a next-available event notification from event queue 116. During the read operation, processor 102 uses head pointer 304 to determine an entry 200 in event queue 116 from which an event notification is to be read. Processor 102 then performs a memory read operation in memory 104 to read the event notification from the determined entry in event queue 116. After reading the event notification, processor 102 processes the event notification, which can include performing corresponding operations to handle the event notification according to the type of event notification. After reading and processing the event notification, processor 102 clears the valid flag for the entry 200 (step 902). Depending on the embodiment, clearing the valid flag can include clearing the bit in metadata 204, updating event code bit(s) in event information 202, and/or clearing other bits in the entry 200 or otherwise associated with the entry 200. Note that processor 102, as part of the read/process operation, also updates/advances head pointer 304 to a next entry in event queue 116.

By clearing the valid flag as described, these embodiments mark the entry as an inactive entry. In some embodiments, once so marked, the entry is marked as not containing an event notification that is waiting for processing.

Handling Remaining Valid Entries in an Original Location for a Relocated Queue

Figure 10:
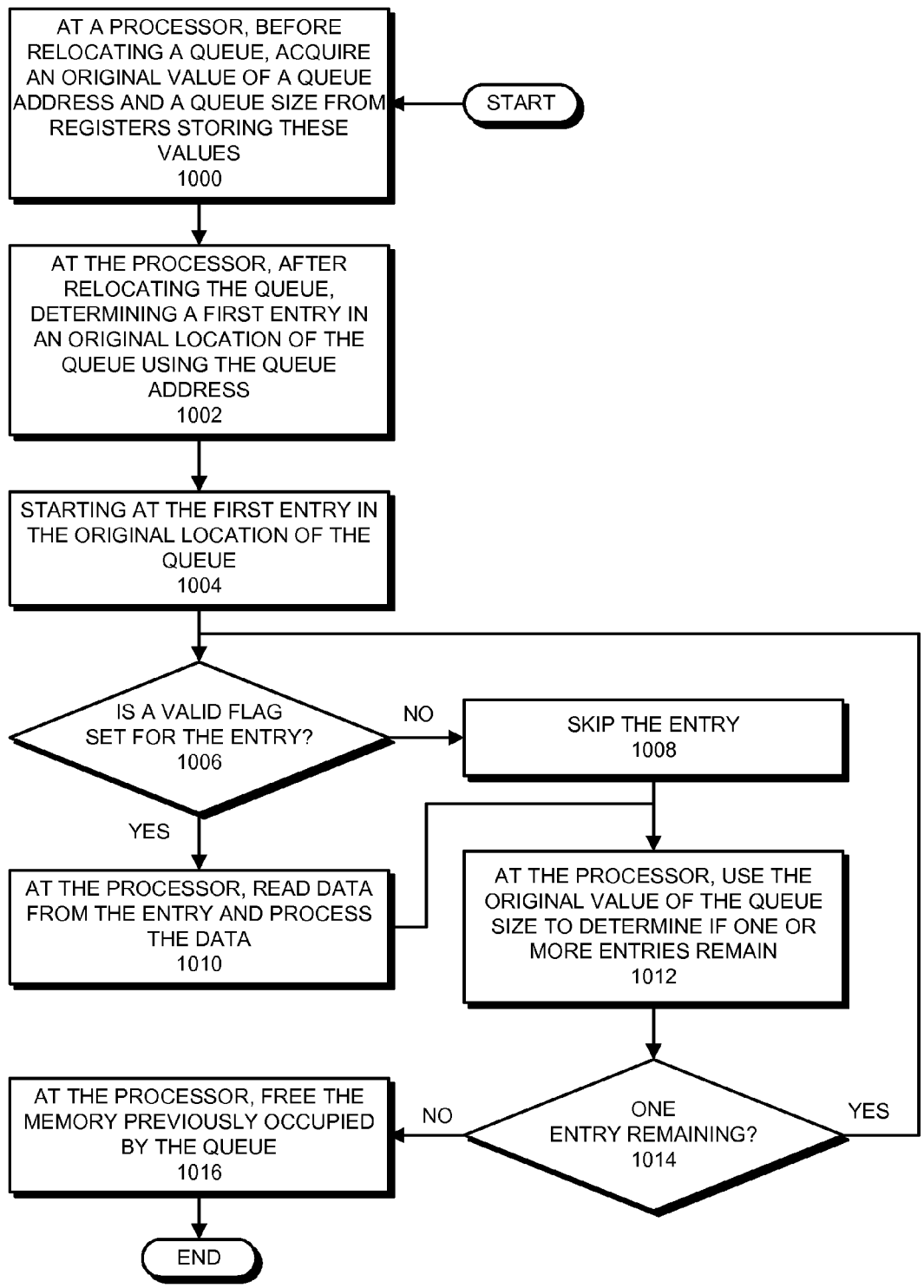
FIG. 10 presents a flowchart illustrating a process for handling valid entries in an original location for a relocated queue in accordance with some embodiments.

FIG. 10 presents a flowchart illustrating a process for handling valid entries in an original location for a relocated queue in accordance with some embodiments. More specifically, during the process shown in FIG. 10, a write mechanism/writer, IOMMU 118, writes an event notification to an entry 200 in event queue 116 and a read mechanism/reader, processor 102, reads the event notification from the entry 200 in event queue 116. Note that the operations shown in FIG. 10 are presented as a general example of operations performed by some embodiments. The operations performed by other embodiments include different operations and/or operations that are performed in a different order. Additionally, although certain mechanisms are used in describing the operations (e.g., processor 102, a software entity, IOMMU 118, etc.), in some embodiments, other mechanisms perform the operations.

The process shown in FIG. 10 starts when processor 102, under the control of a software entity such as operating system 500, application 502, etc., before relocating event queue 116, acquires original values for queue address 300 and queue size 302 (step 1000). Recall that relocating includes updating queue address 300 and relocating with resizing includes updating both queue address 300 and queue size 302, so, by acquiring these values processor 102, captures a state of event queue 116 before event queue is relocated or relocated and resized.

Because the operations performed in FIG. 10 are performed when event queue 116 is relocated, whether or not event queue 116 is also resized, for the remainder of this example event queue is referred to as being "relocated" without mentioning resizing. However, if event queue 116 is also resized, similar operations are performed.

After relocating event queue 116, processor 102 starts the operation of processing any remaining valid entries in the original location of event queue 116. First, processor 102 determines a first entry in the original location of event queue 116 using the original queue address (step 1002). As described herein, queue address 300 is a value that directly or indirectly indicates a location where event queue 116 is stored in memory 104. Processor 102 therefore either uses queue address 300 directly to find the location of the first entry or otherwise computes the location of the first entry using queue address 300.

Then, starting from the first entry in the original location of event queue 116 (step 1004), processor 102 determines if the valid flag is set for the entry (i.e., if the entry holds an event notification that awaits processing) (step 1006). If the valid flag is not set, and thus the entry 200 is inactive, processor 102 skips the entry 200 (step 1008). Otherwise, if the entry 200 is valid/active, processor 102 reads the data from the entry 200 in event queue 116 and processes the data (step 1010).

Next, processor 102 uses the original queue size 302 to determine if one or more entries 200 remain to be checked in event queue 116 (step 1012). For example, processor 102 can keep track of a number of fixed-size entries from event queue 116 that have been processed and use queue size 302 to determine whether (or not) at least one more entry 200 remains to be checked. If at least one entry remains to be checked (step 1014), processor 102 returns to step 1006 to determine if a valid flag is set for the next entry. Otherwise, if no entries remain to be checked (i.e., if all the entries 200 in the original location of event queue 116 have been checked) (step 1014), processor 102 frees the memory occupied by event queue 116 in the original location (step 1016).

Note that, while processor 102 is completing the operations in FIG. 12, a write mechanism such as IOMMU 118 may be writing new event notifications in event queue 116 in the new location. Thus, aside from a brief halt while the values in registers 120 are updated, the write mechanism can continue to write to event queue 116 normally, despite event queue 116 having been relocated and possibly resized. After completing the operations in FIG. 12, processor 102 begins to process event notifications from the new location of event queue 116.

In some embodiments, a computing device (e.g., computing device 100 in FIG. 1 and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A computing device, comprising:
a memory storing a queue;
a plurality of registers storing values associated with the queue, the values comprising a queue address, a queue size, a head pointer, and a tail pointer;
a processor that reads data from the queue and processes the data; and
a write mechanism that writes data to the queue;
wherein the processor and the write mechanism perform operations for relocating the queue in the memory, the operations comprising:
by the processor, updating the value of the queue address in the register storing the queue address; and
by the write mechanism, upon detecting the updating of the value of the queue address, setting values of the head pointer and the tail pointer in corresponding registers equal to one another.

2. The computing device of claim 1, wherein the processor further performs operations for resizing the queue when relocating the queue, the operations comprising:
by the processor:
updating the value of the queue size in the register storing the queue size.

3. The computing device of claim 1, wherein the processor and the write mechanism further perform operations for resizing the queue without relocating the queue, the operations comprising:
by the processor:
updating the value of the queue size in the register storing the queue size; and
setting an adjustment flag; and
by the write mechanism, upon detecting the updating of the value of the queue size:
determining that the adjustment flag is set; and
clearing the adjustment flag without changing values of the head pointer and the tail pointer in corresponding registers.

4. The computing device of claim 1, wherein the updating and setting are performed atomically with respect to writes to the queue performed by the write mechanism so that writes to the queue do not occur between the updating and the setting.

5. The computing device of claim 1, wherein the processor performs operations for reading and processing data that was present in the queue before the queue was relocated, the operations comprising:
by the processor:
before updating the value of the queue address, acquiring an original value of the queue address from the register storing the queue address and a value of the queue size from the register storing the queue size; and
after updating the value of the queue address, starting from a first entry in an original location of the queue indicated by the value of the original queue address and proceeding to a last entry in the original location of the queue as determined using the original value of the queue, for each entry:
determining if a valid flag is set for the entry;
when the valid flag is not set, skipping the entry; and
when the valid flag is set, reading data from the entry and processing the data.

6. The computing device of claim 5, wherein the processor and the write mechanism further perform operations for managing valid flags for entries in the queue, the operations comprising:
by the write mechanism:
when writing data to a given entry in the queue, setting the valid flag for the given entry; and
by the processor:
after reading data from the given entry and processing the data, clearing the valid flag for the given entry.

7. The computing device of claim 5, wherein, after the processor performs operations for reading and processing data that was present in the queue before the queue was relocated, the processor performs operations for:
freeing a portion of the memory in an original location of the queue.

8. The computing device of claim 1, wherein the write mechanism performs operations for writing data to the queue after the queue has been relocated, the operations comprising:
by the write mechanism:
determining that the values in the registers for the head pointer and the tail pointer are equal;
based on this determination, determining an entry to be written in the queue using the value of the queue address in the register storing the queue address; and
writing the data to the queue in the determined entry.

9. The computing device of claim 1, wherein the processor and the write mechanism further perform operations for updating the head pointer and the tail pointer, the operations comprising:
by the write mechanism:
after writing data to an entry in the queue, updating the head pointer to indicate a corresponding subsequent neighboring entry in the queue; and
by the processor:

after reading data from an entry in the queue and processing the data, updating the tail pointer to indicate a corresponding subsequent neighboring entry in the queue.

10. A method for handling a queue stored in a memory of a computing device, the computing device comprising a processor, a write mechanism, and a plurality of registers storing values associated with the queue, the values comprising a queue address, a queue size, a head pointer, and a tail pointer, the method comprising:
relocating the queue in the memory by performing operations for:
by the processor, updating the value of the queue address in the register storing the queue address; and
by the write mechanism, upon detecting the updating of the value of the queue address, setting values of the head pointer and the tail pointer in corresponding registers equal to one another.

11. The method of claim 10, further comprising resizing the queue when relocating the queue by performing operations for:
by the processor:
updating the value of the queue size in the register storing the queue size.

12. The method of claim 10, further comprising resizing the queue without relocating the queue by performing operations for:
by the processor:
updating the value of the queue size in the register storing the queue size; and
setting an adjustment flag; and
by the write mechanism, upon detecting the updating of the value of the queue size:
determining that the adjustment flag is set; and
clearing the adjustment flag without changing values of the head pointer and the tail pointer in corresponding registers.

13. The method of claim 10, wherein the updating and setting are performed atomically with respect to writes to the queue performed by the write mechanism so that writes to the queue do not occur between the updating and the setting.

14. The method of claim 10, further comprising reading and processing data that was present in the queue before the queue was relocated by performing operations for:
by the processor:
before updating the value of the queue address, acquiring an original value of the queue address from the register storing the queue address and a value of the queue size from the register storing the queue size; and
after updating the value of the queue address, starting from a first entry in an original location of the queue indicated by the value of the original queue address and proceeding to a last entry in the original location of the queue as determined using the original value of the queue, for each entry:
determining if a valid flag is set for the entry;
when the valid flag is not set, skipping the entry; and
when the valid flag is set, reading data from the entry and processing the data.

15. The method of claim 14, further comprising managing valid flags for entries in the queue by performing operations comprising:
by the write mechanism:
when writing data to a given entry in the queue, setting the valid flag for the given entry; and
by the processor:
after reading data from the given entry and processing the data, clearing the valid flag for the given entry.

16. The method of claim 14, further comprising, after reading and processing data that was present in the queue before the queue was relocated, performing operations for:
by the processor:
freeing a portion of the memory in an original location of the queue.

17. The method of claim 10, further comprising writing data to the queue after the queue has been relocated by performing operations comprising:
by the write mechanism:
determining that the values in the registers for the head pointer and the tail pointer are equal;
based on this determination, determining an entry to be written in the queue using the value of the queue address in the register storing the queue address; and
writing the data to the queue in the determined entry.

18. The method of claim 10, further comprising updating the head pointer and the tail pointer by performing operations comprising:
by the write mechanism:
after writing data to an entry in the queue, updating the head pointer to indicate a corresponding subsequent neighboring entry in the queue; and
by the processor:
after reading data from an entry in the queue and processing the data, updating the tail pointer to indicate a corresponding subsequent neighboring entry in the queue.

19. A queue stored in a memory, comprising:
a number of entries;
a plurality of registers storing values associated with the queue, the values comprising a queue address, a queue size, a head pointer, and a tail pointer;
wherein a writer of the queue and a reader of the queue perform operations comprising:
by the reader, updating the value of the queue address in the register storing the queue address; and
by writer, upon detecting the updating of the value of the queue address, setting values of the head pointer and the tail pointer in corresponding registers equal to one another.

20. The queue of claim 19, wherein the reader further performs operations for resizing the queue when relocating the queue, the operations comprising:
updating the value of the queue size in the register storing the queue size.

21. The queue of claim 19, wherein the writer and reader further perform operations for resizing the queue without relocating the queue, the operations comprising:
by the reader:
updating the value of the queue size in the register storing the queue size; and
setting an adjustment flag; and
by the writer, upon detecting the updating of the value of the queue size:
determining that the adjustment flag is set; and
clearing the adjustment flag without changing values of the head pointer and the tail pointer in corresponding registers.

* * * * *